US006859706B1

United States Patent
Schmidt

(10) Patent No.: US 6,859,706 B1
(45) Date of Patent: Feb. 22, 2005

(54) CONTROL CIRCUIT FOR A PASSENGER PROTECTION DEVICE IN A MOTOR VEHICLE AND CORRESPONDING METHOD OF OPERATION

(75) Inventor: Claus Schmidt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 58 days.

(21) Appl. No.: 10/311,866

(22) PCT Filed: Aug. 22, 2000

(86) PCT No.: PCT/DE00/02854

§ 371 (c)(1),
(2), (4) Date: Dec. 20, 2000

(87) PCT Pub. No.: WO02/16169

PCT Pub. Date: Feb. 28, 2002

(51) Int. Cl.$^7$ ............................ G06F 17/00; G06F 7/00
(52) U.S. Cl. .............................. 701/45; 701/36; 701/29; 701/34; 280/734; 280/735; 180/271; 180/273
(58) Field of Search .............................. 701/45, 36, 29, 701/34; 280/735, 734; 180/271, 273

(56) References Cited

FOREIGN PATENT DOCUMENTS

| DE | 37 36 294 A1 | 5/1989 |
| DE | 196 19 414 C1 | 8/1997 |
| WO | WO 98/19171 | 5/1998 |
| WO | WO 00/41917 | 7/2000 |

*Primary Examiner*—Olga Hernandez
(74) *Attorney, Agent, or Firm*—Morrison & Foerster LLP

(57) ABSTRACT

The invention relates to a control circuit for at least one passenger protection system (6–8) in a motor vehicle, comprising a plurality of sensors for detecting a respective parameter of the motor vehicle, and an evaluation unit connected to the sensors at the input side and adapted to produce, in accordance with the measured parameters, a release signal (Enable1) activating the passenger protection device in the case of an accident. The control circuit further comprises a check unit (10) connected to the sensors at the input side and adapted to check the mutual plausibility of the parameters measured by the sensors and to output a first disable signal (Error) for the passenger protection device in the case of an incorrect plausibility check. A logical circuit (11–14, 21–28) is connected to the evaluation unit (4, 5) and the check unit on the input side and to the passenger protection device on the output side and blocks activation of the passenger protection device when a first disable signal (Error) is received. At least one inducer element (15–17) is provided for simulating a malfunction of the sensors and/or of the check unit. Said inducer element simulates only a single sensor or only a part of the sensors, thereby simulating a malfunction of the remaining sensors.

15 Claims, 4 Drawing Sheets

CONTROL CIRCUIT FOR A PASSENGER PROTECTION DEVICE IN A MOTOR VEHICLE AND CORRESPONDING METHOD OF OPERATION

CLAIM FOR PRIORITY

This application is a national stage application under 371, claiming the benefit of PCT/DE00/02854, which was filed on Aug. 22, 2000.

TECHNICAL FIELD OF THE INVENTION

The invention relates to a control circuit for at least one vehicle-occupant protection system in a motor vehicle and to an associated operating method.

BACKGROUND OF THE INVENTION

In modern motor vehicles, vehicle-occupant protection systems such as airbags, side bags or seatbelt pretensioners are used to reduce the severity of the injuries to vehicle occupants which occur in the case of accidents. The triggering of the vehicle-occupant protection systems is carried out here by means of a plurality of acceleration sensors which are arranged in the motor vehicle and which measure the acceleration which respectively occurs in a predefined direction in the case of an accident. As the individual acceleration sensors have different spatial orientations, both the direction and the magnitude of the acceleration can be calculated from the output signals of the acceleration sensors, the vehicle-occupant protection systems being activated if the magnitude of the acceleration exceeds a predefined limiting value (for example 10 g).

German laid-open application DE 196 45 952 A1 discloses a control circuit which evaluates the measurement signals of a plurality of acceleration sensors in order to detect an accident of the motor vehicle and activates the vehicle-occupant protection systems as a function of the measurement signals. Furthermore, this publication discloses that the measurement signals of the various acceleration sensors are to be subjected to a plausibility test in order to detect a malfunction of individual sensors or of the control circuit. If the various acceleration sensors are arranged, for example, in a star shape in one plane, the sum of the positive or negative accelerations which are measured by the acceleration sensors must be equal to zero. If the composite signal of the acceleration sensors deviates from this value, a malfunction is present in one or more of the sensors or else in the control unit itself. The plausibility check, described above, of the measurement signals generated by the acceleration sensors therefore advantageously makes it possible to detect a malfunction of the sensors or of the evaluation unit which analyses the measurement signals of the acceleration sensors in order to detect an accident.

However, a disadvantage of the known control circuit described above is that when the measurement signals which are supplied by the acceleration sensors are subject to a plausibility check during normal operation the check may be subject to errors.

On the one hand, this can lead to undesired triggering of a vehicle-occupant protection system if an acceleration sensor outputs a high acceleration value owing to a malfunction and the plausibility check does not detect the malfunction of the sensor.

On the other hand, an error in the plausibility check can lead to a situation in which the triggering of the vehicle-occupant protection system is disabled when there is an accident although the acceleration sensors measure a high acceleration value.

SUMMARY OF THE INVENTION

The invention discloses a vehicle-occupant protection system in a motor vehicle to the effect that the operational capability of the plausibility check can be tested. Furthermore, the invention is based on an operating method for a control circuit which is improved in this way.

In one embodiment of the invention, the invention comprises carrying out, before or during the normal operation of the control circuit, a self-test in which a single sensor or some of the sensors are excited in order, for example, to simulate an acceleration in an acceleration sensor, whereas the other sensors are not excited, or are excited in some other way, so that the plausibility check normally yields an errored result.

In one aspect of the invention, in order to evaluate the measurement signals supplied by the sensors during normal operation, the control circuit according to the invention preferably has an evaluation unit which is connected at the input end to the sensors and which detects an accident on the basis of the measured parameters and then generates a triggering signal which activates the vehicle-occupant protection system. The parameters measured by the sensors are therefore analyzed by the evaluation unit during normal operation in order to detect an accident.

Furthermore, the control circuit according to another aspect of the invention has a check unit in order to subject the parameters measured by the sensors to a plausibility check. For this purpose, the check unit is connected at the input end to the sensors and, when a plausibility check fails, generates a disable signal at the output end in order to prevent activation of the vehicle-occupant protection system.

In addition, the control circuit according to one embodiment of the invention has a logic circuit which is connected at the input end both to the evaluation unit and to the check unit, and at the output end actuates the vehicle-occupant protection system, the vehicle-occupant protection system being actuated as a function of the triggering signal generated by the evaluation unit and the disable signal which is generated by the check unit.

The self-test of the control circuit can preferably be initiated by the user. For this purpose, the excitation element which is used to excite a sensor is preferably connected to a controllable switching element which can be activated by the user in order to initiate the self-test.

The logic circuit for actuating the vehicle-occupant protection system as a function of the disable signal and the triggering signal is preferably also connected at the input end to the controllable switching element in order to receive a second disable signal, the logic circuit disabling or enabling the activation of the vehicle-occupant protection system as a function of the two disable signals.

In this way, the logic circuit can disable the activation of the vehicle-occupant protection system, for example, if the first disable signal generated by the check unit is present and the plausibility check is thus errored, while at the same time the second disable signal which is generated by the controllable switching element is not present as the control circuit is in the normal operating mode and not in the self-test operating mode.

Furthermore, the logic circuit can disable the activation of the vehicle-occupant protection system if the second disable signal is present during the self-test operating mode but the first disable signal is not present, and the plausibility check has thus run successfully despite the simulated malfunction, which makes it possible to conclude that the plausibility check was errored.

In the preferred embodiment of the control circuit according to the invention, the logic circuit has a sample-and-hold element in order to maintain the first disable signal generated by an errored plausibility check even when there is a successful plausibility check in the meantime.

The triggering of the vehicle-occupant protection system is therefore disabled here after an errored plausibility check until the sample-and-hold element is reset. For this purpose, the sample-and-hold element can be connected, for example, to a switching element which can be operated manually.

BRIEF DESCRIPTION OF THE DRAWINGS

Further advantageous developments of the invention are explained below together with the description of the preferred exemplary embodiments according to the invention with reference to the figures, in which.

DETAILED DESCRIPTION OF THE INVENTION

Figure 1:
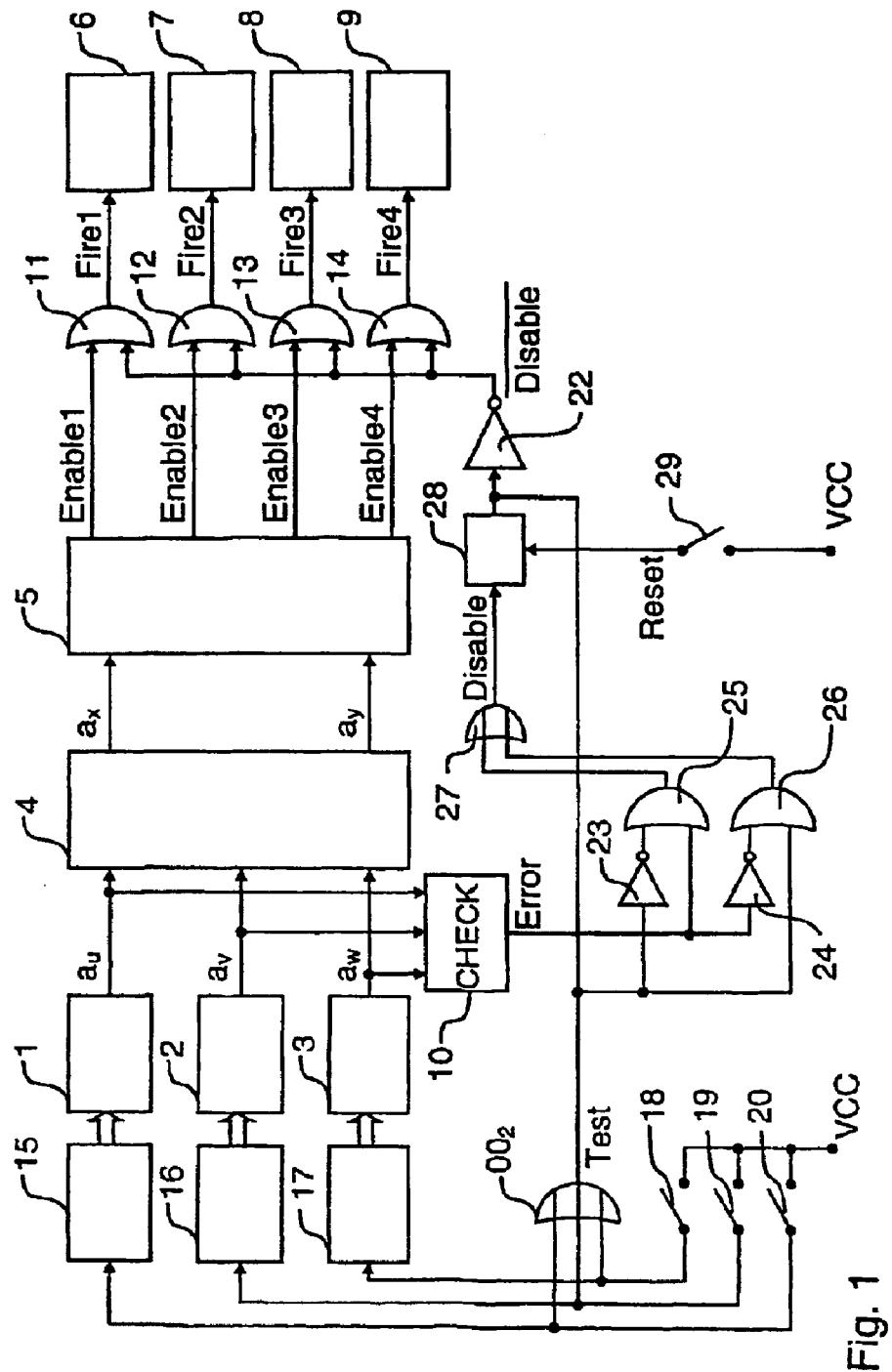
FIG. 1 shows a control circuit according to an embodiment of the invention as a block circuit diagram.
Figure 2:
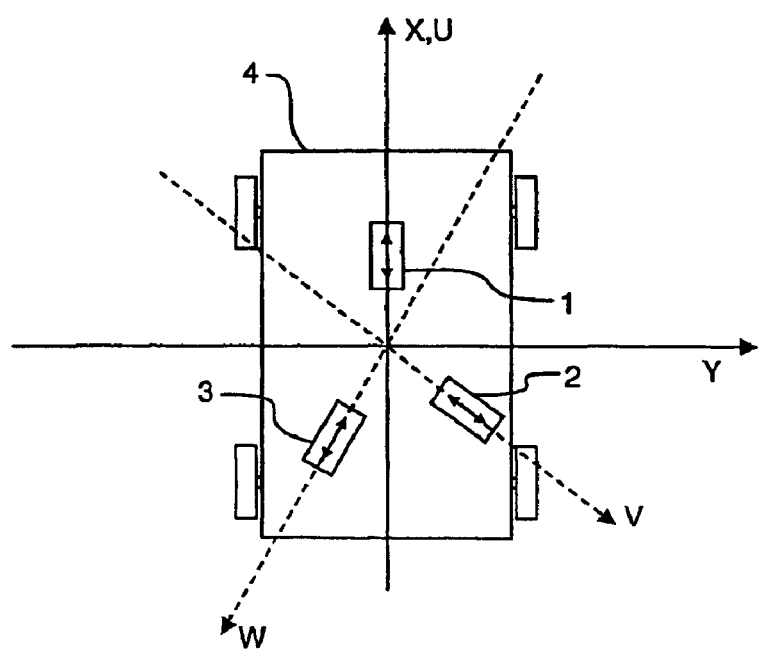
FIG. 2 shows an arrangement of the acceleration sensors in a motor vehicle.

The control circuit illustrated in FIG. 1 has a plurality of acceleration sensors 1, 2, 3 which are arranged in a horizontal plane in a motor vehicle 4, at different angles with respect to the longitudinal axis x of the motor vehicle 4, as is apparent from FIG. 2.

The acceleration sensors 1, 2, 3 are connected at the output ends to an arithmetic unit 4 which calculates the acceleration values $a_x$ and $a_y$ in the longitudinal direction X of the vehicle and in the transverse direction Y of the vehicle from the measurement signals $a_u$, $a_v$, $a_w$ of the acceleration sensors 1, 2, 3, according to the following formulas:

$$a_x = a_u + a_v \cdot \cos<(X,V) + a_w \cdot \cos<(X,W)$$

$$a_y = a_v \cdot \cos<(Y,V) + a_w \cdot \cos<(Y,W).$$

At the output end, the arithmetic unit 4 is connected to an evaluation unit 5 which compares the acceleration values $a_x$ and $a_y$ in the longitudinal or transverse direction of the vehicle with predefined maximum values, and when the maximum values are exceeded generates actuation signals Enable1–Enable4, which are to used to activate vehicle-occupant protection systems 6, 7, 8, 9, the vehicle-occupant protection systems 6, 7 being airbags, whereas the vehicle-occupant protection systems 8, 9 are side bags.

Furthermore, the circuit arrangement illustrated has a check unit 10 which is connected at the input end to the acceleration sensors 1, 2, 3, and carries out a plausibility check of the measured acceleration values $a_u$, $a_v$ and $a_w$ in order to detect a malfunction of one of the acceleration sensors 1, 2, 3. In this way, the check unit 10 calculates the sum of the acceleration measured values $a_u$, $a_v$ and $a_w$ which has to be equal to zero when the function is satisfactory. The check unit 10 then compares the sum signal formed in this way with a predefined maximum value and outputs a disable signal Error in the sum signal exceeds the predefined maximum value.

At the output end, the check unit 10 is connected to the vehicle-occupant protection systems 6, 7, 8, 9 via a logic circuit, the logic circuit having four AND elements 11, 12, 13, 14 which are connected at the input end to the evaluation unit 5 and to the check unit 10, and at the output end are each connected to one of the vehicle-occupant protection systems 6, 7, 8, 9. In this way, the vehicle-occupant protection system 6 is activated, for example, by an activation signal Fire1 if the triggering signal Enable1 is present at the AND element 11 at the input end and the disable signal Disable thus assumes a low level. The triggering of the vehicle-occupant protection systems 6, 7, 8, 9 is therefore disabled by the check unit 10 if the plausibility check carried out by the check unit 10 has provided an errored result.

Furthermore, the control circuit illustrated permits a self-test in which the plausibility check carried out by the check unit 10 is tested. For this purpose, the control circuit has three excitation elements 15, 16, 17 which are each assigned to one of the acceleration sensors 1, 2, 3 and permit a separate excitation of the acceleration sensors 1, 2, 3 in order to simulate a malfunction of the rest of the acceleration sensors. In order to actuate the excitation elements 15, 16, 17, three controllable switching elements 18, 19, 20 are provided which can be activated separately by the user. When the switching element 18 is activated, for example the excitation element 17 is activated, after which the acceleration sensor 3 measures an acceleration, whereas the acceleration sensors 1, 2 are not excited and therefore do not measure any acceleration. When only the acceleration sensor 3 is excited, the check unit 10 therefore generates an error signal Error which is fed to the logic circuit already mentioned above, which will now be described in more detail.

The logic circuit thus has an OR element 21 which is connected at the input end to the three switching elements 18, 19, 20 and generates a disable signal Test with a high level when at least one of the switching elements 18, 19, 20 is activated. The disable signal Test is fed to the AND elements 11, 12, 13, 14 via an inverter 22 in order to prevent the vehicle-occupant protection systems 6, 7, 8, 9 from being activated during the self-test.

In what follows, the self-test of the control circuit will be described for the case in which the acceleration sensors 1, 2, 3 and the check unit are operating satisfactorily. In this case, a high level appears both at the output of the OR element 21 and at the output of the check unit 10, the disable signal Error which is generated by the check unit 10 and the disable signal Test which is generated by the in the AND element 21 being fed to two AND elements 25, 26 via two inverters 23, 24. The two AND elements 25, 26 are connected via an OR element 27 to a sample-and-hold element 28 which holds the disable signal Disable present at the input end until the user activates a resetting input Reset of the sample-and-hold element 28 by means of a switching element 29. The sample-and-hold element 28 therefore prevents the vehicle-occupant protection systems 6, 7, 8, 9 from being activated after a failed plausibility check even after a successful plausibility check in the meantime until the sample-and-hold element 28 is reset by means of the switching element 29.

When the accelerated sensors 1, 2, 3 and the check unit 10 are operating satisfactorily during the self-test, a high level appears at the output of the check unit 10 and at the output of the OR element 21, respectively, so that the signal Disable assumes a low level at the input of the sample-and-hold element 28. This is appropriate as the disable signal Error appearing at the output of the check unit 10 shows, during the self-test, that the acceleration sensors 1, 2, 3 and the check unit 10 are operating satisfactorily.

On the other hand, when there is a malfunction of the acceleration sensors 1, 2, 3 or of the check 10 during the self-test, a low level appears at the output of the check unit 10 so that the two inputs of the AND element 26 assume a high level which is passed on via the OR element 27 to the sample-and-hold element 28, which leads to permanent disabling of an activation of the vehicle-occupant protection systems 6, 7, 8, 9.

In what follows, the normal operating mode of the control circuit will now be operated, the switching elements 18, 19, 20 being opened so that a low level appears at the output of the OR element 27. When the acceleration sensors 1, 2, 3 and the check unit 10 are functioning satisfactorily, a low level also appears at the output of the check unit 10 in the normal operating mode as the plausibility check then proceeds successfully. In this case, no disable signal with a high level appears at the input of the sample-and-hold element 28 either so that the enabling of the vehicle-occupant protection systems 6, 7, 8, 9 is not disabled.

On the other hand, if there is a malfunction of the sensors 1, 2, 3, the plausibility check by the check unit 10 leads to a high level at the output of the check unit 10 so that a high level appears at the output of the AND element 25, which high level is fed via the OR element 27 as a disable signal to the sample-and-hold element 28, after which the activation of the vehicle-occupant protection systems 6, 7, 8, 9 is disabled until the sample-and-hold element is reset again by means of the switching element.

Figure 3:
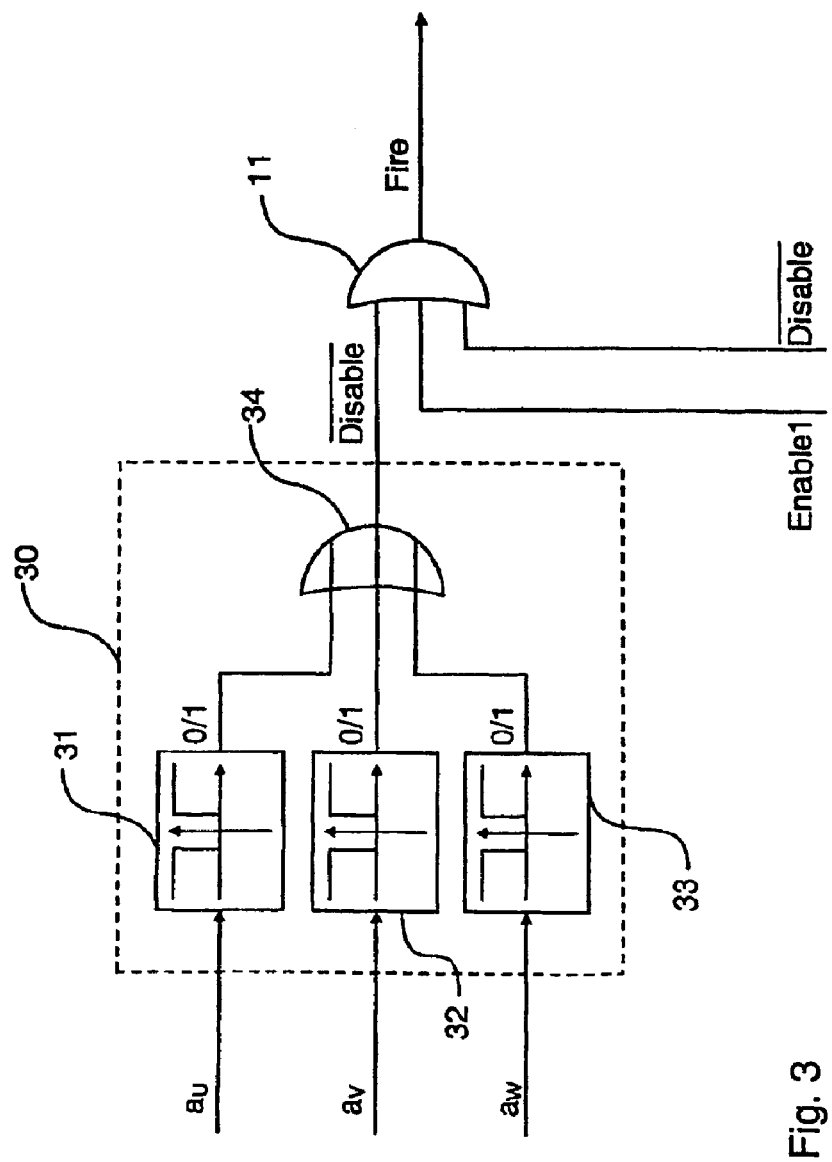
FIG. 3 shows an optional supplementary module for the control circuit illustrated in FIG. 1.
Figure 4:
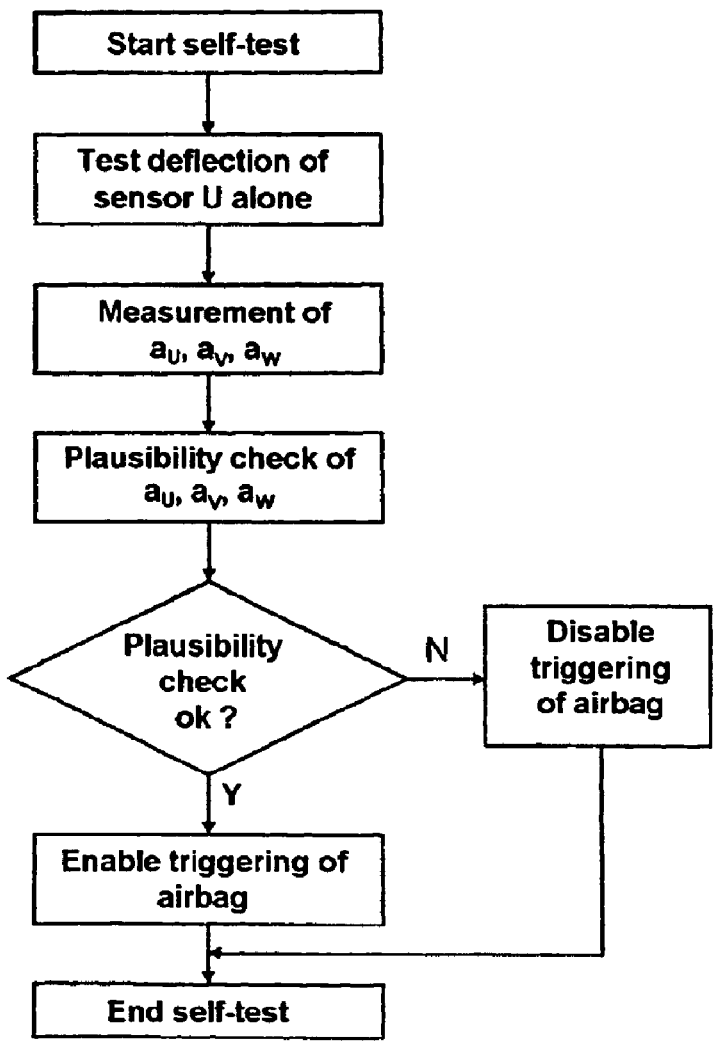
FIG. 4 shows an operating method according to an embodiment of the invention as a flowchart.

FIG. 3 shows an optional module 30 for the control circuit which is described above and illustrated in FIG. 1, the module 30 being connected at the input end to the three acceleration sensors 1, 2, 3 and at the output end to the individual AND elements 11, 12, 13, 14 which actuate the vehicle-occupant protection systems 6, 7, 8, 9. For the sake of simplification, the AND element 11 is illustrated in FIG. 3, but the module 30 is connected at the output end to all the AND elements 11–14 which thus each have three controlled inputs. The module 30 has a plurality of evaluation units 31, 32, 33 which compare the acceleration values $a_u$, $a_v$, $a_w$ measured by the acceleration sensors 1, 2, 3 with predefined minimum values and output a low level at the output end when the value drops below the minimum values, the evaluation units 31, 32, 33 being connected at the output end to an OR element 34 which actuates the AND elements 11–14. Activation of the vehicle-occupant protection systems 6, 7, 8, 9 is therefore prevented independently of the result of the plausibility check even if the acceleration values measured by the acceleration sensors 1, 2, 3 are all below the minimum values because the motor vehicle is stationary, for example.

The invention is not restricted to the exemplary embodiment described above. Instead, a multiplicity of variants and modifications which make use of the inventive idea and therefore also fall within the scope of protection are conceivable.

What is claimed is:

1. A control circuit for at least one vehicle-occupant protection system in a motor vehicle, comprising:
   a plurality of sensors to detect a respective parameter of the motor vehicle;
   an evaluation unit which is connected to the sensors at the input end to generate a triggering signal which activates the vehicle-occupant protection system based on the measured parameters when there is an accident;
   a check unit, which is connected to the sensors at the input end, to check a mutual plausibility of the parameters which are measured by the sensors and to output a first disable signal for the vehicle-occupant protection system when there is an errored plausibility check; and
   a logic circuit, which is connected at the input end to the evaluation unit and to the check unit and at the output end to the vehicle-occupant protection system for disabling activation of the vehicle-occupant protection system when the first disable signal is present, wherein
   to simulate a malfunction of the sensors and/or of the check unit, at least one excitation element provided which excites a single sensor or some of the sensors and simulates a malfunction of the rest of the sensors.

2. The control circuit as claimed in claim 1, wherein the excitation element is connected to a first controllable switching element to perform controllable activation.

3. The control circuit as claimed in claim 2, wherein to receive a second disable signal for the vehicle-occupant protection system, the logic circuit is connected to the first controllable switching element during the simulation of a sensor malfunction, the logic circuit disabling or enabling the activation of the vehicle-occupant protection system as a function of the two disable signals.

4. The control circuit as claimed in claim 3, wherein the logic circuit disables the activation of the vehicle-occupant protection system if the first disable signal is present and/or the second disable signal is not present.

5. The control circuit as claimed in claim 3, wherein the logic circuit disables the activation of the vehicle-occupant protection system if the first disable signal is not present although the second disable signal is present.

6. The control circuit as claimed in claim 1, wherein the logic circuit has a sample-and-hold element to maintain the first disable signal, generated after an errored plausibility check, even if there was a successful plausibility check in the meantime.

7. The control circuit as claimed in claim 6, wherein the logic circuit actuates the sample-and-hold element to permanently disable the vehicle-occupant protection system if, during the simulation of a sensor malfunction, the second disable signal is present whereas the second disable signal is not present.

8. The control circuit as claimed in claim 6, wherein the sample-and-hold element has a resetting input to delete the stored disable signal.

9. The control circuit as claimed in claim 8, wherein the resetting input is connected to a switching element to be able to delete the disable signal manually.

10. The control circuit as claimed in claim 1, further comprising another check unit which is connected to the sensors at the input end is provided, the another check unit comparing the parameters measured by the sensors in each case with a predefined minimum value and generating a third disable signal if the measured parameters drop below the predefined minimum values.

11. The control circuit as claimed in claim 1, wherein at least one sensor is an acceleration sensor or an angle of inclination sensor.

12. The control circuit as claimed in claim 1, wherein the vehicle-occupant protection system is an airbag, a side bag, a seatbelt pretensioner or a seatbelt force limiter.

13. An operating method for a control circuit, comprising:
   measuring at least one parameter of the motor vehicle by a plurality of sensors;
   evaluating the parameters which are measured by the sensors to detect an accident;

performing a mutual plausibility check of the parameters measured by the sensors during normal operation; and activating at least one vehicle-occupant protection system when there is an accident and a successful plausibility check, wherein at least one sensor is excited in a self-test to simulate a malfunction of the rest of the other sensors, the activation of the vehicle-occupant protection system being disabled if the plausibility check proceeds without errors despite the simulated malfunction of the sensors.

14. The operating method as claimed in claim 13, wherein the activation of the vehicle-occupant protection system is permanently disabled if the plausibility check is errored in the normal operating mode and/or has proceeded without errors in the self-test.

15. The operating method as claimed in claim 13, wherein the parameters which are measured by the sensors are compared with predefined minimum values, the activation of the vehicle-occupant protection system being disabled if the parameters measured by the sensors are below the minimum value.

* * * * *